April 16, 1935.　　　F. CULICH, JR　　　1,997,812
AUTOMATIC TRANSMISSION
Filed Jan. 17, 1934　　5 Sheets-Sheet 3

Fig. 3.

Inventor
F. P. Culich, Jr.
By Clarence A. O'Brien
Attorney

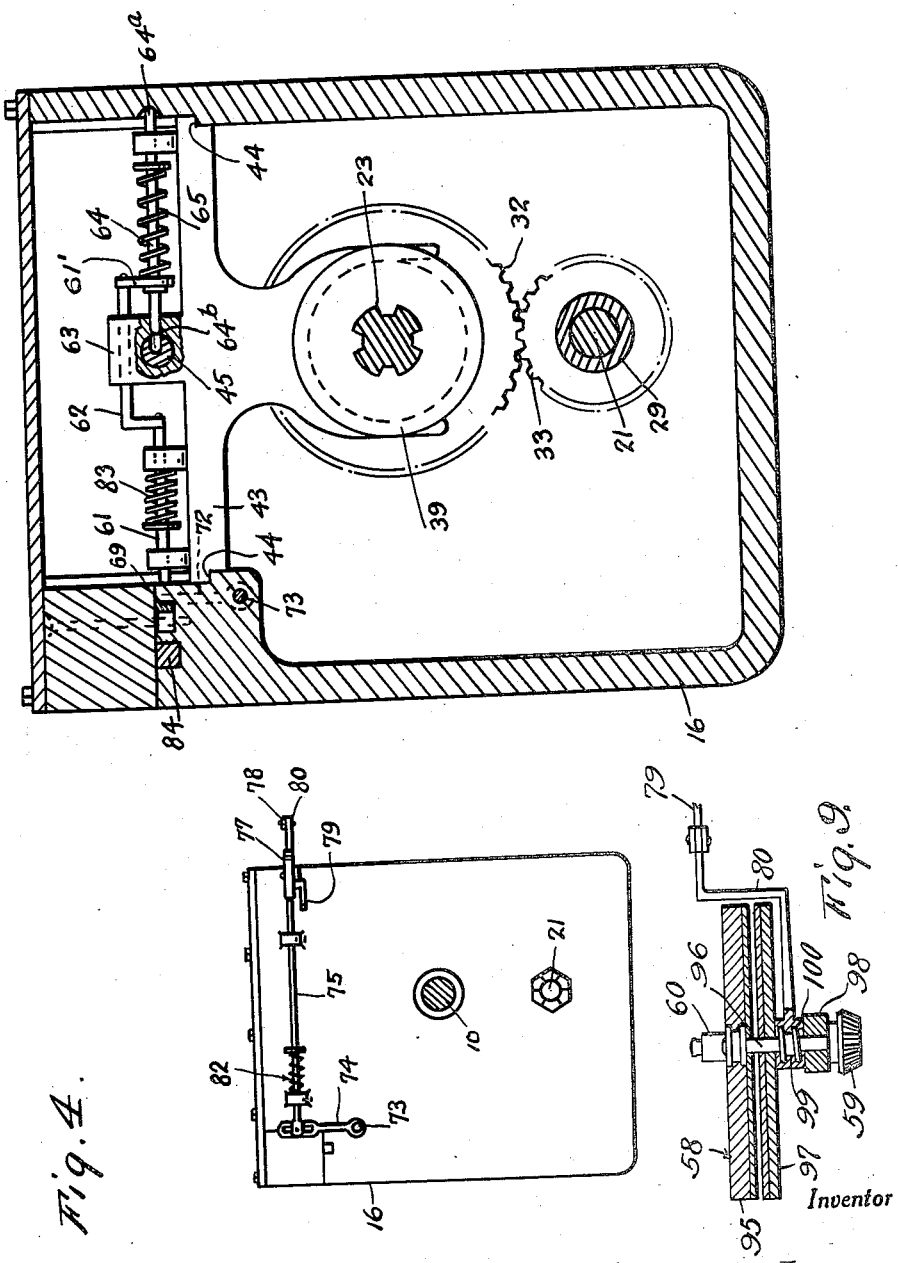

April 16, 1935.  F. CULICH, JR  1,997,812
AUTOMATIC TRANSMISSION
Filed Jan. 17, 1934   5 Sheets-Sheet 5
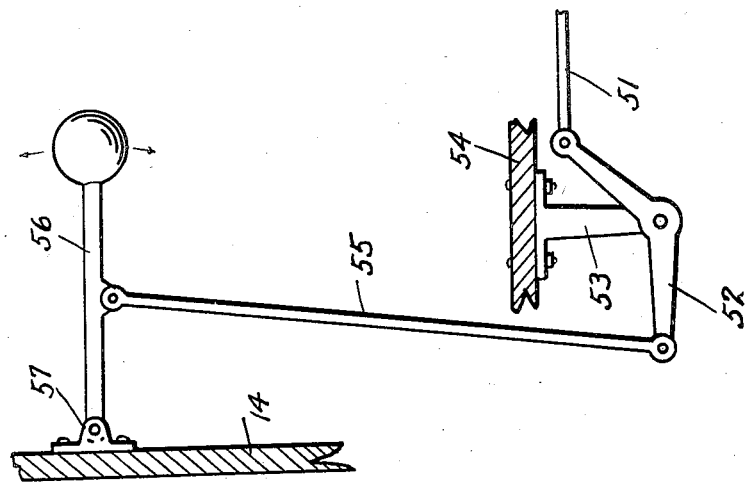
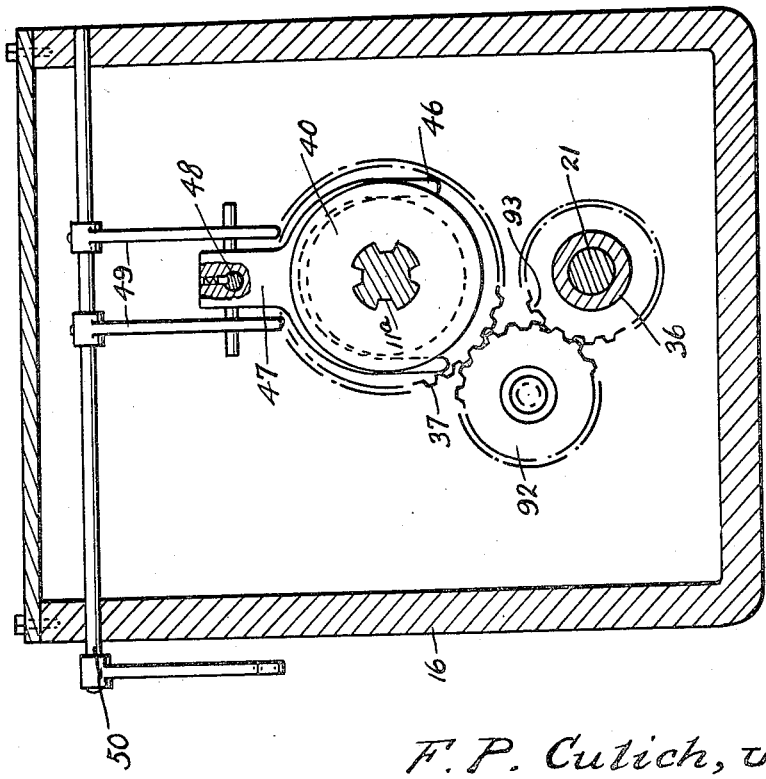
Inventor
*F. P. Culich, Jr.*
By *Clarence A. O'Brien*
Attorney Patented Apr. 16, 1935

1,997,812

UNITED STATES PATENT OFFICE 1,997,812

AUTOMATIC TRANSMISSION

Frank Culich, Jr., Butte, Mont.

Application January 17, 1934, Serial No. 707,027

8 Claims. (Cl. 74—336.5)

This invention relates to transmissions for motor driven vehicles and has as its object the provision of an improved automatic transmission which will at the same time be under the control of the operator in a manner to operate when desired by the driver of the vehicle pushing downwardly on the clutch pedal.

The invention together with its objects and advantages will be best understood from a study of the following description taken in connection with the accompanying drawings wherein:

Figure 3 is an enlarged fragmentary horizontal sectional view through the transmission case.

Figure 1:
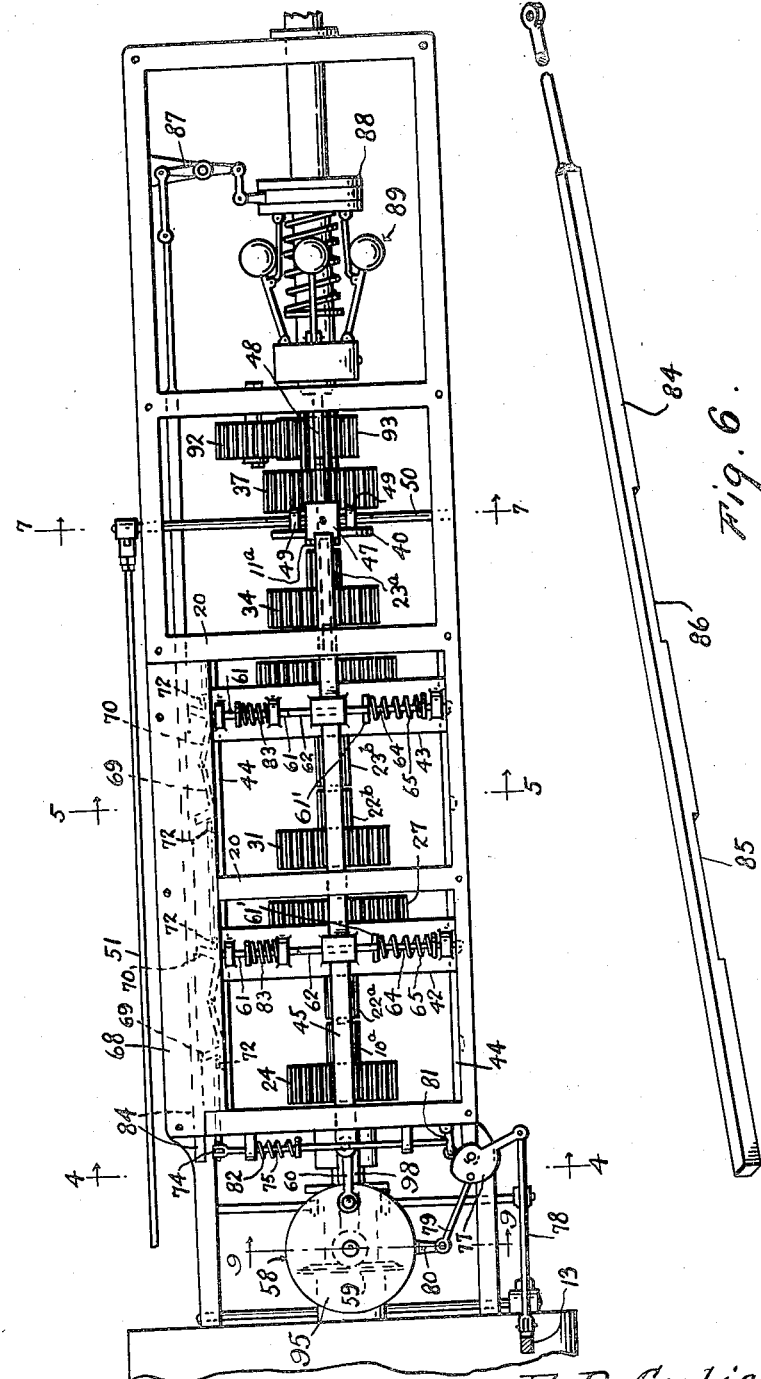
Figure 1 is a top plan view of the transmission.

Figures 4, 5 and 7 are detail views taken substantially on the lines 4—4, 5—5 and 7—7 respectively of Figure 1.

Figure 6 is a perspective view of a governor actuated rod and

Figure 8 is a fragmentary detail view illustrating the location of the shift lever.

Figure 9 is a section on line 9—9 of Figure 1.

Referring to the drawings by reference numerals it will be seen that 10 indicates the drive shaft of the vehicle driven from the internal combustion engine in the usual manner; 11 indicates the propeller shaft; while reference numeral 12 indicates generally the main clutch between the drive shaft 10 and the internal combustion engine; reference numeral 13 the clutch pedal and reference numeral 14 the instrument board of a vehicle. The improved transmission is indicated generally by the reference numeral 15 and includes a suitable casing 16 divided into cells or sections 17, 18, and 19 by partitions 20 which are suitably apertured to accommodate the transmission shaft hereinafter more fully referred to and the counter shaft 21 of the transmission.

The transmission shaft comprises two longitudinally alined sections 22, 23 journalled intermediate their respective ends in suitable apertures provided in the partitions 20, and respectively having their end portions suitably provided with splines as shown. In the present instance the transmission shaft 23 is provided at one end with a reduced portion fitting in a socket provided in the adjacent end of the transmission shaft 22.

One end of the drive shaft 10 extends into the section 17 of the gear case, and in said end is provided with a suitable socket in which is journalled the reduced end of the transmission shaft section 22. One end of the propeller shaft 11 extends into the transmission case section 19 and at said end is provided with a reduced portion that is journalled in the socket provided in the adjacent end of the transmission shaft section 23.

Fixed on the end 10a of the drive shaft 10 is a speed gear 24 that is in constant mesh with a gear 25 provided on one end of the hub 26 mounted on the counter shaft 21 within the section 17. Engaged with the splines on the end 22a of the transmission shaft section 22 for rotation with the shaft and for axial movement relative to the shaft is a speed gear 27 that is movable into and out of mesh with a second gear 28 provided on the hub 26.

A hub 29 is mounted on the counter shaft 21 within the section 18 and is provided at one end with a gear 30 which is in constant mesh with a speed gear 31 on the end 22b of the shaft section 22. On the end 23b of the shaft section 23 is a speed gear 32 that is movable into and out of mesh with a gear 33 also provided on the hub 29. Fixed on the end 23a of the transmission shaft section 23 is a speed gear 34 that is in mesh with a gear 35 provided on a hub 36 mounted on the counter shaft 21 within the section 19 of the transmission casing. Engaged with the spline equipped end 11a of the propeller shaft is a speed gear 37. Gears 27, 32, and 37 respectively are provided with clutch collars 38, 39 and 40 respectively. For shifting the collars 38, 39 there are provided the shifting forks 41 and 42' respectively. The forks 41, 42' are respectively carried by slides 42, 43 operating within the sections 17, 18 on guide rails 44. For successively shifting the slides 42, 43, there is provided a shifting rod 45 together with other mechanism hereinafter more fully described.

For shifting the clutch collar 40 there is provided a yoke or fork 46 provided with an apertured head 47 that is slidably engaged with a guide rod 48 suitably and fixedly mounted within the section 19. Head 47 has projecting laterally from opposite sides thereof suitable pins with which are engaged the bifurcated ends of arms 49 fixedly secured to a shaft 50. One end of the shaft 50 is operatively connected through the medium of a link 51 with a bell crank 52 that is mounted pivotally on a bracket 53 carried by some suitable fixed part 54 of the automobile. The bell crank lever 52 is also connected by a link 55 with a shift lever 56 that is pivotally mounted on a bracket 57 secured to the instrument board as shown in Figure 8. For releasably locking the clutch collar 40 at the desired adjustment there are provided in the rod 48 three notches, one for forward, one for reverse, and an intermediate notch for neutral, and cooperable with the notch is a suitable spring pressed pin carried by the head 47 of the yoke 46 (see Figure 7).

For automatically reciprocating the shift rod 45 there is provided a suitable clutch device 58 which is driven from the engine shaft, when the clutch device 58 is engaged, through the medium of bevel gearing 59. The driven member of the clutch device 58 is provided with an eccentric pin to which is connected one end of a connecting rod 60 that is also pivotally connected with the forward end of the shift rod 45.

As shown clearly in Figures 3 and 5 each of the slides 42, 43 has a pusher rod 61 slidably mounted thereon that has an end 62 operating in a part 63 of the slide, a spring 83 tending to move the rod 61 to the left in Figure 5. Also slidably mounted on said slide is a rod 64 which is normally urged in a reverse direction relative to the rod 61 through the medium of a spring 65. A member 61' connects the inner end of the part 62 of the rod 61 with the rod 64, this member having a hole therein through which the rod 64 passes, with said member engaging a collar on the rod 64 and said member is also engaged by an end of the spring 65. Rod 64 has one end 64a thereof adapted to engage in a notch 66 provided in one side of the gear case 16 and a second end 64b adapted to engage a lateral notch provided in the shift rod 45 when the end 64a of said latch rod moves out of the notch 66.

As shown in Figure 3 each of the gear case sections or compartments 17, 18 is provided on one side thereof with the aforementioned notch 66, and also with a second notch 67 to receive the end 64a of the latch bar 64 when the proper slide is in its forward position.

On the side thereof opposite to the notches 66, 67 each of the sections 17, 18 accommodates an end portion of a block 68. Each end of the block 68 at its inner side is suitably grooved, slotted, and apertured to accommodate a pair of oppositely extending dogs 69, 70 pivoted at one end to a common pivot rod 71. For normally holding the dogs 69, 70 in projected position, that is in the position shown in Figure 3 there are provided stop bars 72 engageable with the free ends of the dogs 69, 70 and secured to a rock shaft 73 to rotate therewith. At the forward end thereof the shaft 73 is provided with an arm 74 which has a suitable lost motion connection with a link 75 that operates in suitable guides 76 provided at the forward end of the transmission casing 16. The link 75 is operated from a cam 77 suitably mounted adjacent the forward end of the gear case 16 and provided with a lever arm which is pivotally connected through the medium of a link 78 with the clutch pedal 13 as suggested in Figures 1 and 2. The cam 77 is also connected by a connecting rod 79 with the control arm 80 of the clutch device 58. The operative connection between the rod 75 and the cam member 74 consists of a pivotally mounted arm 81 which as shown in Figure 1 is provided with a notch that accommodates the free end of the rod 75, and also with a roller that engages the periphery of the cam 77. For yieldably engaging the rod 75 with the arm 81 there is provided a suitable spring 82. It will thus be seen that when the pedal 13 is pressed downwardly cam 75 will be rotated for swinging the arm 81 resulting in a rotation of the shaft 73 in a direction to move the stop members 72 away from the free ends of the dogs 69, 70 to permit the said dogs to move inwardly of the block 68. At the same time the movement of the cam 77 will operate the control arm 80 of the clutch 77 device to engage the clutch in a manner to drive the rod 45 through the gearing 59 and the clutch device 58 for reciprocating the shift rod 45 to shift the proper slide 42 in the proper direction.

The rods 61 are normally projected to engage the dogs 69, 70 through the medium of the springs 83 and for operation on the dogs 69, 70 in opposition to the springs 83 is a governor actuated rod 84 that is provided with notches 85, 86 there being one notch for each pair of dogs. The rod 84 is slidably mounted in the block 68 and is connected at one end with a suitable shifting device 87 that is operatively connected with the sliding member 88, of the governor 89 that is suitably mounted on the propeller shaft 11. For engagement with the rod 84 the dogs 69, 70 are respectively provided with projections 90, 91. It will thus be seen that when for example, the projection 91 of a dog 70 is engaged with the rod 84 in the manner suggested in Figure 3 the dog will be held against inward movement in opposition to the spring pressed rod 61.

It will thus be seen that when for example under influence of the governor 89 the rod 84 is moved backwardly or to the right in Figure 3 a slight distance the projection 91 of the dog 70 will be forced by the rod 61 associated with the slide 42 to move inwardly of the notch 85 of the rod 84, and this will of course result in a movement of the latch rod 64 for drawing the end 64a thereof out of engagement with the notch 66 in the side of the casing section 17 and project the end 64b of the latch bar 64 into engagement with a notch in the shifting rod 45 thus operatively connecting the slide 42 with the rod 45 to cause the slide 42 to slide with the rod 45 toward the left in Figure 3. This of course will result in a shifting of the clutch collar 38 to the left in Figure 2 to engage the end 10a of the drive shaft 10 and thereby place the drive shaft 10 in driving engagement with the counter shaft section 22.

As before stated, any suitable form of clutch means 58 can be used, but I have shown this clutch means as composed of the upper member 95 rotatably arranged on the shaft 96, but held against sliding movement thereon, and the lower member 97 slidably and non-rotatably arranged on the shaft and this shaft carries one of the gears 59 and is supported in the stationary member 98 and has a spiral thread 99 on a part thereof which is located above the supporting member and the control arm 80 has an internally threaded collar 100 at one end which encircles the threaded part of the shaft. Thus when this arm 80 is moved in one direction, it will ride up the threaded part of the shaft so as to push the lower part 97 against the upper part 95 to engage the clutch means, but when it is moved in the opposite direction, it will ride downwardly and thus the two clutch members are moved apart. The link 79 which connects the arm 80 to the cam is so attached to the cam that the arm 80 is not moved until the cam has been turned an appreciable distance. Thus the clutch device is only rendered operative when the clutch pedal 13 is almost all the way down. As will be understood, the shaft 96 and the lower member 97 are constantly rotated from the engine, even when the main clutch 12 is disengaged, but the upper member only rotates when the pedal 13 has been pushed almost all the way down.

Figure 2:
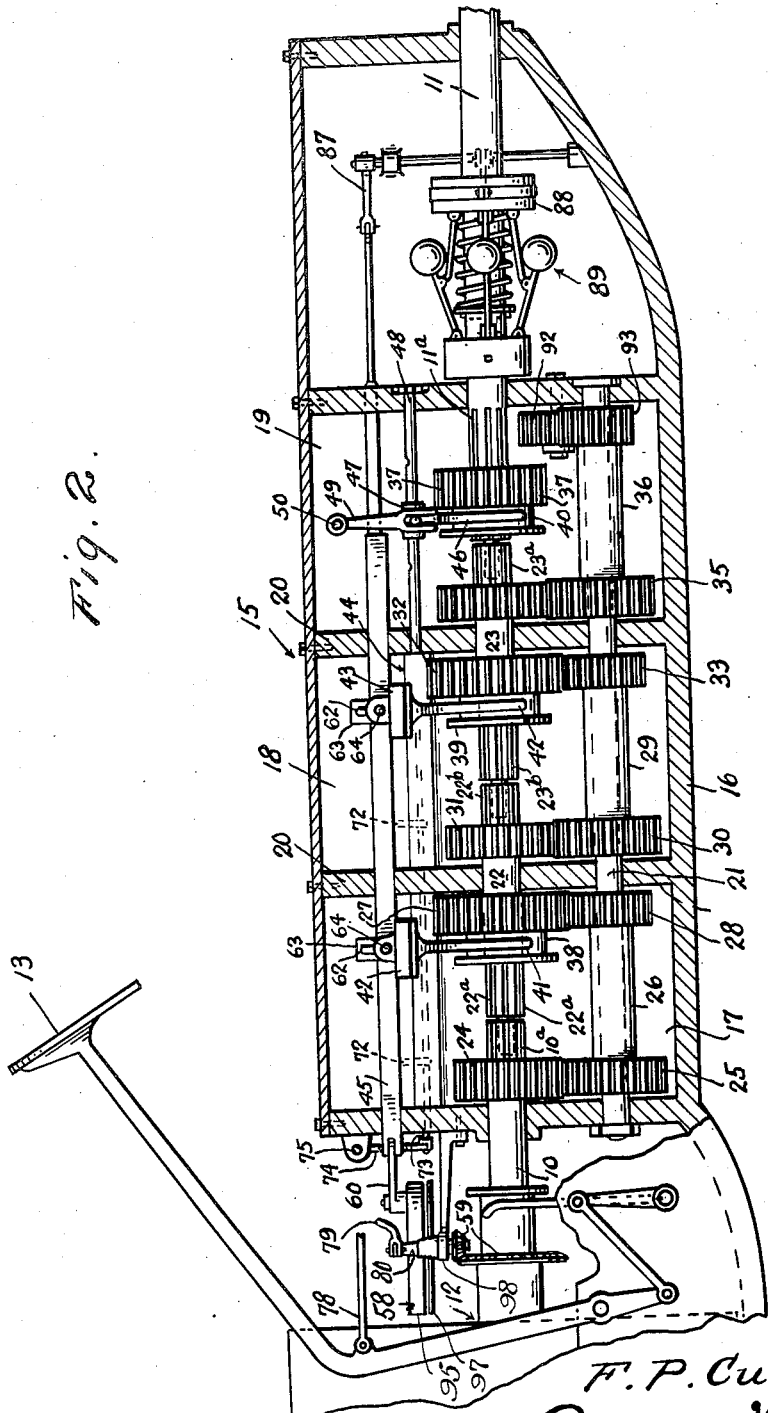
Figure 2 is a vertical sectional view through the casing of the transmission showing the parts in neutral position.

The operation of the device will now be described:

The neutral position of the parts are as shown in Figure 2. For low speed the operator presses on the pedal 13 in the usual manner to disengage the clutch 12, at the same time manipulating the lever 56, swinging the same upwardly to shift the clutch collar 40 from the position shown in Figure 2 into a position engaging the end 23a of the transmission shaft section 23 to provide a forward drive connection between the shaft section 23 and the propeller shaft 11. The pedal 13 is then released, and drive is transmitted through the transmission in a manner thought apparent from the motor to the propeller shaft.

As the speed of the vehicle increases the pedal 13 is again depressed for releasing the clutch 12. At the same time this depressing of the pedal 13 will cause the cam 77 to be rotated and through the mechanism described thus rock the shaft 73 for moving the stops 72 out of engagement with the dogs 69, 70. Also, the increased speed of the vehicle, that is to say of the driving wheels of the vehicle will result in the operation of the governor 89 sufficiently to slide the rod 84 in a rearward direction, that is to say, to the right in Figure 3 only so far as to bring the slot 85 opposite the lug 91 of the dog 70 associated with section 17 of the transmission casing. When this takes place the dog 70 as before explained will rotate about its pivot 71 in an anti-clockwise direction to project the lug 91 thereof into the slot 85 under action of the spring pressed rod 61 associated with the slide 42. As a result, and also as previously explained this movement of the rod 61 will impart a corresponding movement to the latch bar 64 so as to move the end 64a of the latch bar out of engagement with the notch 66 and the end 64b of said latch bar into engagement with a notch on the rod 45.

The depressing of the clutch pedal 13 as just explained will also result in an engagement of the clutch 58 so that as before explained drive is transmitted from the motor to the rod 45 for shifting the rod forwardly or to the left in Figure 1. The rod 45 will carry with it the slide 42 so as to engage the collar 38 with the end 10a of the drive shaft 10 for placing said drive shaft and the transmission shaft section 22 in driving engagement. As the slide 42 comes into position to effect this engagement of the clutch collar 38 with the end 10a of shaft 10 dog 69 associated with the casing section 17 and held against inward movement by reason of the engagement of its projection 90 with an unnotched part of the shifted rod 84 will be held fixed in the path of the rod 61 carried by the slide 42. As a result rod 61 will be caused to slide against the action of spring 83 and this will result in a corresponding movement of the latch rod 64 for moving the end 64b of the latch rod out of engagement with the rod 45 and the end 64a of the latch rod into engagement with the notch 67 thereby secure the slide 42 in its forward position and leaving the rod 45 free for its return stroke.

It will thus be seen that clutch 38 being now engaged with the end 10a of shaft 10, and clutch 40 remaining in engagement with the end 23a of clutch shaft 23 gears 27, 28 will be out of mesh while gears 24—25; 31—30; and 34—35 will be in mesh for driving the propeller shaft 11 at what may be termed second speed.

As the speed of the vehicle further increases the pedal 13 is again depressed so that the operation above described will be substantially repeated with the exception that of course the slide 42 will remain in its forward position and the slide 43 moved with the shift bar 45 from its rear position shown in Figure 3 to its forward position for effecting an engagement of the clutch 39 with the end 22b of the transmission shaft section 22 to provide a drive connection between the shaft sections 22, 23. In this high or third speed it will be apparent that clutch 38 will be engaged with the end 10a of the drive shaft 10; clutch 39 engaged with the end 22b of the transmission shaft section 22, and clutch 40 is engaged with the end 23a of the transmission shaft section 23 to provide a direct forward drive for the propeller shaft 11.

As is thought obvious the operation will be reversed to that above described in going from a higher to a lower speed gear ratio.

To place the vehicle in reverse the clutch pedal 13 will of course be depressed in the usual manner and the lever 56 moved downwardly so as to slide the clutch collar 40 and gear 37 associated therewith to the right in Figure 2 to engage gear 37 with an idler gear 92 that is in constant mesh with a gear 93 on the hub 36 arranged in the gear case section 19.

Having thus described my invention, what I claim as new is:

1. In a transmission, alined driving and driven shafts, a transmission shaft between and alined with the driving and driven shafts, said transmission shaft including alined shaft sections, a counter shaft, speed gearing connecting the driving, driven and transmission shaft sections respectively with the counter shaft, clutches respectively controlling the driving connection between the driving shaft and one of the transmission shaft sections, the other of the transmission shaft sections and the driven shaft and between the sections of the transmission shaft; manual means connected with the clutch for the last named transmission shaft section and the driven shaft for shifting said clutch, power driven means connected with the others of said clutches for successively shifting them, such means including a clutch device, locking means for holding said others of said clutches against shifting movement, manually operated means for controlling the clutch device and for releasing said locking means, and governor control means for releasably locking said others of the clutches in fixed position.

2. In a transmission, alined driving and driven shafts, main clutch means including a pedal for connecting the driving shaft to a prime mover, a transmission shaft between and alined with the driving and driven shafts, said transmission shaft including alined sections, a counter shaft, speed gearing connecting the driving, driven and transmission shaft sections respectively with the counter shaft, clutches respectively controlling the driving connection between the driving shaft and one of the transmission shaft sections, and between the other of the transmission shaft sections and the driven shaft, and between the sections of the transmission shaft; a rockably mounted shifting fork engaged with the clutch for the last named transmission shaft section and the driven shaft for shifting said clutch, a shifting lever, and an operating connection between said shifting lever and said fork for transmitting movement of the lever to the fork, means, including a clutch device, operated from the prime mover and connected with the others of said clutches for successively shifting them, means for moving the clutch device into operative position when the pedal of the main clutch is depressed, and governor control means for releasably locking said others of the clutches in fixed position.

3. In a transmission, alined driving and driven shafts, a transmission shaft between and alined with the driving and driven shafts, said transmission shaft including alined shaft sections, a counter shaft, speed gearing connecting the driving, driven and transmission shaft sections respectively with the counter shaft, clutches connected with certain of the speed gear respectively controlling driving connection between the driving shaft and one of the transmission shaft sections, and between the other of the transmission shaft sections and the driven shaft, and between the sections of the transmission shaft; manual means connected with the clutch for the last named transmission shaft section and the driven shaft for shifting said clutch, a clutch device, gearing operatively connecting the clutch device with the prime mover of a vehicle, shifting forks engaged with the others of the said clutches, slide members with which said shifting forks are engaged for movement therewith, a shifting rod, an eccentric connection between said shifting rod and the clutch device for reciprocating the rod, for successively shifting said slide members to effect a change in the speed gear ratio, latch means for releasably connecting said slides with the shifting rod, and for releasably securing said slides in fixed adjusted position relative to said shifting rod, and governor actuated means controlling said latch means.

4. In a transmission, alined driving and driven shafts, a transmission shaft between and alined with the driving and driven shafts, said transmission shaft including alined sections, a counter shaft, speed gearing connecting the driving, driven and transmission shaft sections respectively with the counter shaft, clutches respectively controlling driving connection between the driving shaft and one of the transmission shaft sections, and between the other of the transmission shaft sections and the driven shaft, and between the sections of the transmission shaft; manual means connected with the clutch for the last named transmission shaft section and the driven shaft for shifting said clutch to provide either a forward drive or a reverse drive, optionally, and power driven means connected with the others of the said clutches for successively shifting them to effect a change in the gear ratio from a lower to a higher speed or vice versa, and power driven means including a shifting rod, driving means connecting the shifting rod with the prime mover of the vehicle for shifting said rod incidental to a release of the main clutch of the vehicle, slides for said others of the clutches, shifting forks carried by the slides and engaged with said others of the clutches, latch bars carried by the slides and engageable with notches in the shifting rod for releasably connecting the slides with the shifting rod, and governor control means controlling movement of the latch bars for alternately locking the slides in fixed position relative to the shifting rod, and in engagement with the shifting rod for movement therewith.

5. In a transmission of the class described, a clutch shifting mechanism including slides, guides supporting the slides, clutch shifting forks carried by the slides, clutches engaged by the fork, mechanism operatively connected with the slides for successively shifting them in either of two directions and including a shiftable rod and mechanism for shifting the rod, latch rods slidably mounted on the slides and shiftable in one direction to lock the slides in fixed position relative to said rods, and in a reverse direction to engage the rods for operatively connecting the associated slides with the rod, and means for controlling the shifting of said latch rods including actuating rods slidably mounted on the slides and operatively connected with the latch rod, a pair of oppositely swingable dogs arranged at one side of the path of each slide and successively engaged by the actuating rods, spring means engaged with the actuating rods for normally urging the respective actuating rods into engagement with said dogs, a slide bar movable in a path laterally of and parallel to the path of movement of the slides and having unnotched portions with which the dogs are engaged against movement in opposition to the actuating rods, and notched portions providing spaces inwardly of which the dogs are movable under action of the actuating rods and mechanism for reciprocating said slide rods.

6. In a transmission of the class described, a clutch shifting mechanism including slides, guides supporting the slides, clutch shifting forks carried by the slides, clutches engaged by the fork, mechanism operatively connected with the slides for successively shifting them in either of two directions and including a shiftable rod and mechanism for shifting the rod, latch rods slidably mounted on the slides and shiftable in one direction to lock the slides in fixed position relative to said rods, and in a reverse direction to engage the rods for operatively connecting the associated slides with the rod, and means for controlling the shifting of said latch rods including actuating rods slidably mounted on the slides and operatively connected with the latch rod, a pair of oppositely swingable dogs arranged at one side of the path of each slide and successively engaged by the actuating rods, spring means engaged with the actuating rods for normally urging the respective actuating rods into engagement with said dogs, a slide bar movable in a path laterally of and parallel to the path of movement of the slides and having unnotched portions with which the dogs are engaged against movement in opposition to the actuating rods, and notched portions providing spaces inwardly of which the dogs are movable under action of the actuating rods and mechanism for reciprocating said slide rods, other means engageable with the dogs for holding the dogs in position and in opposition to the actuating rod independently of said slide rod.

7. In a transmission of the class described, a clutch shifting mechanism including slides, guides supporting the slides, clutch shifting forks carried by the slides, clutches engaged by the fork, mechanism operatively connected with the slides for successively shifting them in either of two directions and including a shiftable rod and mechanism for shifting the rod, latch rods slidably mounted on the slides and shiftable in one direction to lock the slides in fixed position relative to said rods, and in a reverse direction to engage the rods for operatively connecting the associated slides with the rod, and means for controlling the shifting of said latch rods including actuating rods slidably mounted on the slides and operatively connected with the latch rod, a pair of oppositely swingable dogs arranged at one side of the path of each slide and successively engaged by the actuating rods, spring means engaged with the actuating rods for normally urging the respective actuating rods into engagement with said dogs, a slide bar movable in a path laterally of and parallel to the path of movement of the slides and having unnotched portions with which the dogs are engaged against movement in opposition to the actuating rods, and notched portions providing spaces inwardly of which the dogs are movable under action of the actuating rods and mechanism for reciprocating said slide rods, other means engageable with the dogs for holding the dogs in position and in opposition to the actuating rod independently of said slide rod, the mechanism for reciprocating the slide rod including a governor and an operating connection between the governor and the slide rod.

8. In a transmission of the class described, a clutch shifting mechanism including slides, guides supporting the slides, clutch shifting forks carried by the slides, clutches engaged by the fork, mechanism operatively connected with the slides for successively shifting them in either of two directions and including a shiftable rod and mechanism for shifting the rod, latch rods slidably mounted on the slides and shiftable in one direction to lock the slides in fixed position relative to said rods, and in a reverse direction to engage the rods for operatively connecting the associated slides with the rod, and means for controlling the shifting of said latch rods including actuating rods slidably mounted on the slides and operatively connected with the latch rod, a pair of oppositely swingable dogs arranged at one side of the path of each slide and successively engaged by the actuating rods, spring means engaged with the actuating rods for normally urging the respective actuating rods into engagement with said dogs, a slide bar movable in a path laterally of and parallel to the path of movement of the slides and having unnotched portions with which the dogs are engaged against movement in opposition to the actuating rods, and notched portions providing spaces inwardly of which the dogs are movable under action of the actuating rods and mechanism for reciprocating said slide rods, other means engageable with the dogs for holding the dogs in position and in opposition to the actuating rod independently of said slide rod, the mechanism for reciprocating the slide rod including a governor and an operating connection between the governor and the slide rod, and mechanism for operating said other dog controlling means including a clutch pedal, a rock shaft, stop members on the rock shaft engageable with the dogs, and an operating connection between the clutch pedal and the rock shaft.

FRANK CULICH, Jr.